(12) United States Patent
Kim et al.

(10) Patent No.: US 9,552,013 B2
(45) Date of Patent: Jan. 24, 2017

(54) MOBILE TERMINAL HAVING A DOUBLE-SIDED DISPLAY AND CONTROLLING METHOD THEREOF

(71) Applicant: LG ELECTRONICS INC., Seoul (KR)

(72) Inventors: Yongsin Kim, Seoul (KR); Doyoung Lee, Seoul (KR); Hyorim Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 13/899,205

(22) Filed: May 21, 2013

(65) Prior Publication Data

US 2014/0285498 A1  Sep. 25, 2014

(30) Foreign Application Priority Data

Mar. 21, 2013 (KR) .......................... 10-2013-0030402

(51) Int. Cl.
*G06F 15/00* (2006.01)
*G06F 1/16* (2006.01)
*G06F 1/32* (2006.01)

(52) U.S. Cl.
CPC ........... *G06F 1/1601* (2013.01); *G06F 1/1637* (2013.01); *G06F 1/1643* (2013.01); *G06F 1/1647* (2013.01); *G06F 1/3265* (2013.01); *Y02B 60/1242* (2013.01)

(58) Field of Classification Search
CPC .... G06F 1/1601; G06F 1/1637; G06F 1/3265; G06F 1/1647; G06F 1/1643
USPC .......................................................... 345/501
See application file for complete search history.

(56) References Cited

U.S. PATENT DOCUMENTS

| | | | |
|---|---|---|---|
| 2007/0109291 A1* | 5/2007 | Hoshino et al. | 345/211 |
| 2008/0051101 A1 | 2/2008 | Ha et al. | |
| 2008/0259071 A1* | 10/2008 | Nemoto | G06F 21/316 345/212 |
| 2010/0026504 A1* | 2/2010 | Shono et al. | 340/636.12 |
| 2010/0048252 A1 | 2/2010 | Kang et al. | |
| 2010/0227651 A1* | 9/2010 | Kim | G06F 3/1423 455/566 |
| 2011/0133687 A1* | 6/2011 | Kim et al. | 320/101 |
| 2011/0254824 A1 | 10/2011 | Chuang et al. | |
| 2011/0260948 A1 | 10/2011 | Teng et al. | |

FOREIGN PATENT DOCUMENTS

| | | |
|---|---|---|
| EP | 2157772 A1 | 2/2010 |
| EP | 2226787 A2 | 9/2010 |

* cited by examiner

*Primary Examiner* — Ke Xiao
*Assistant Examiner* — Kim-Thanh T Tran
(74) *Attorney, Agent, or Firm* — Birch, Stewart, Kolasch & Birch, LLP

(57) ABSTRACT

A mobile terminal including a first display unit, a second display unit having an e-paper display panel, a sensor unit configured to detect an input signal and transmit the detected input signal to a processor, a power unit configured to supply power. The processor is further configured to detect a first time prior to a predetermined period from a second time at which the power of the mobile terminal is turned off, disable a detection of the input signal for the mobile terminal and control a content currently displayed on the first display unit to be displayed on the second display unit between the first time and the second time, and switch a state of the mobile terminal to a power-off state.

15 Claims, 12 Drawing Sheets

FIG. 2
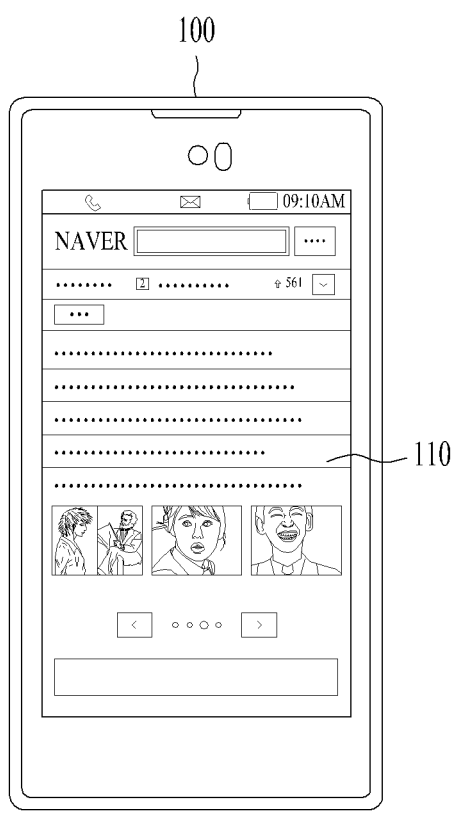
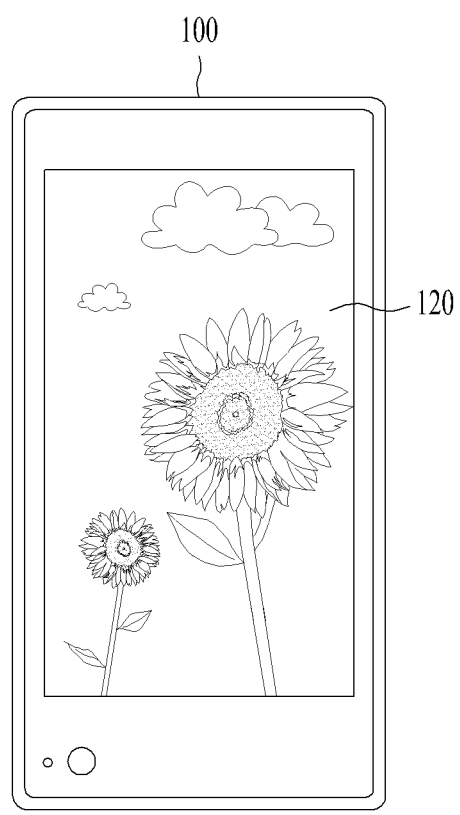
(a) (b)

FIG. 3
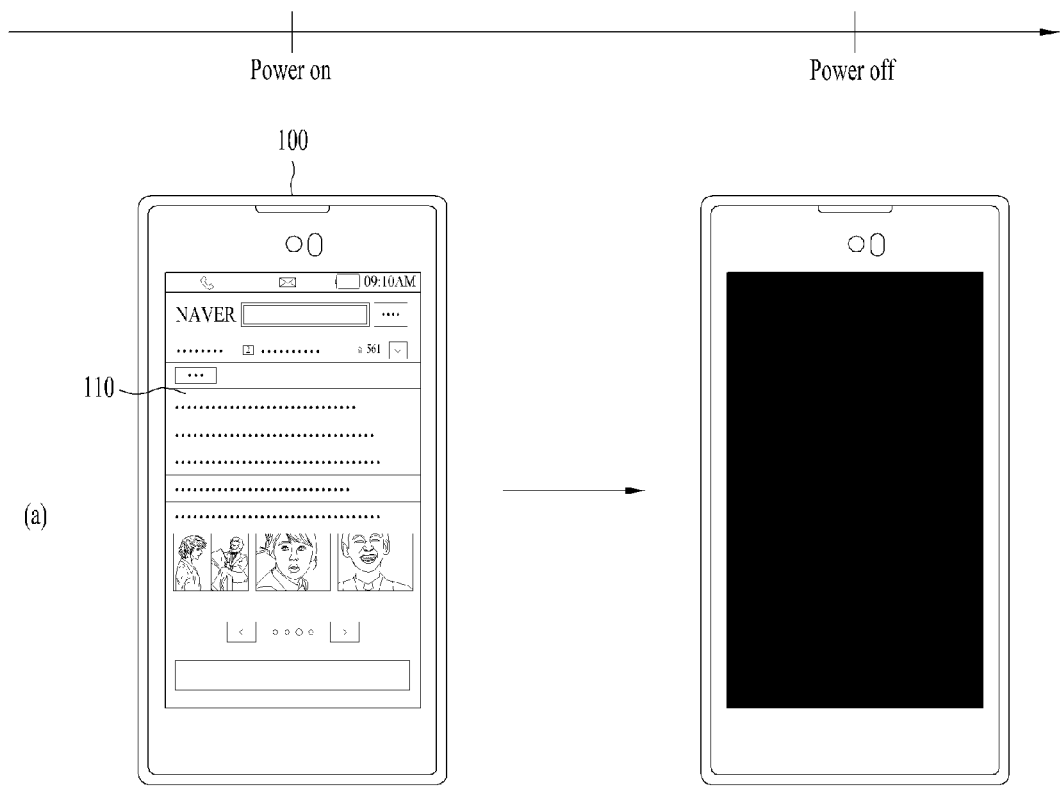
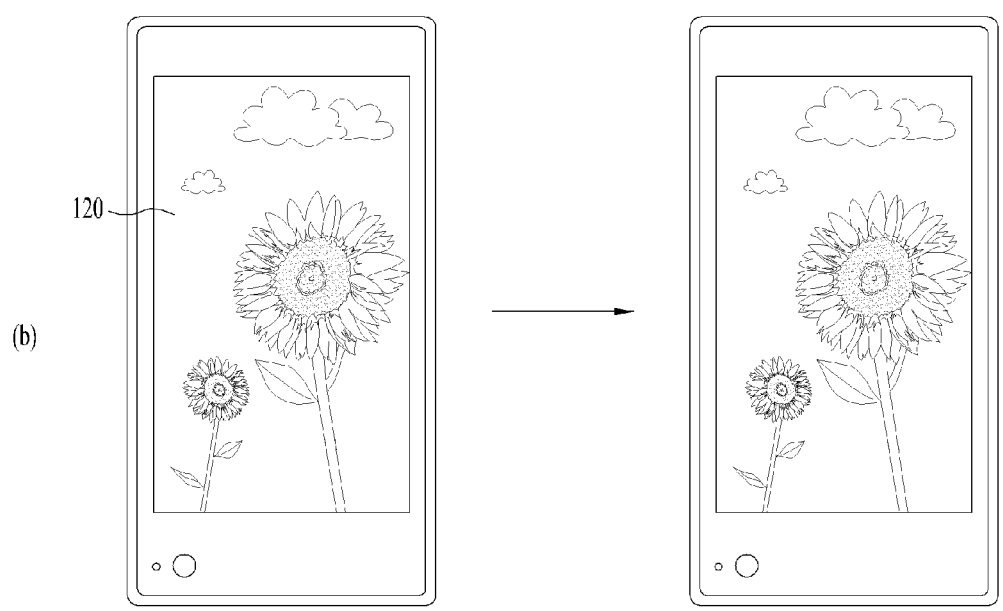

FIG. 5
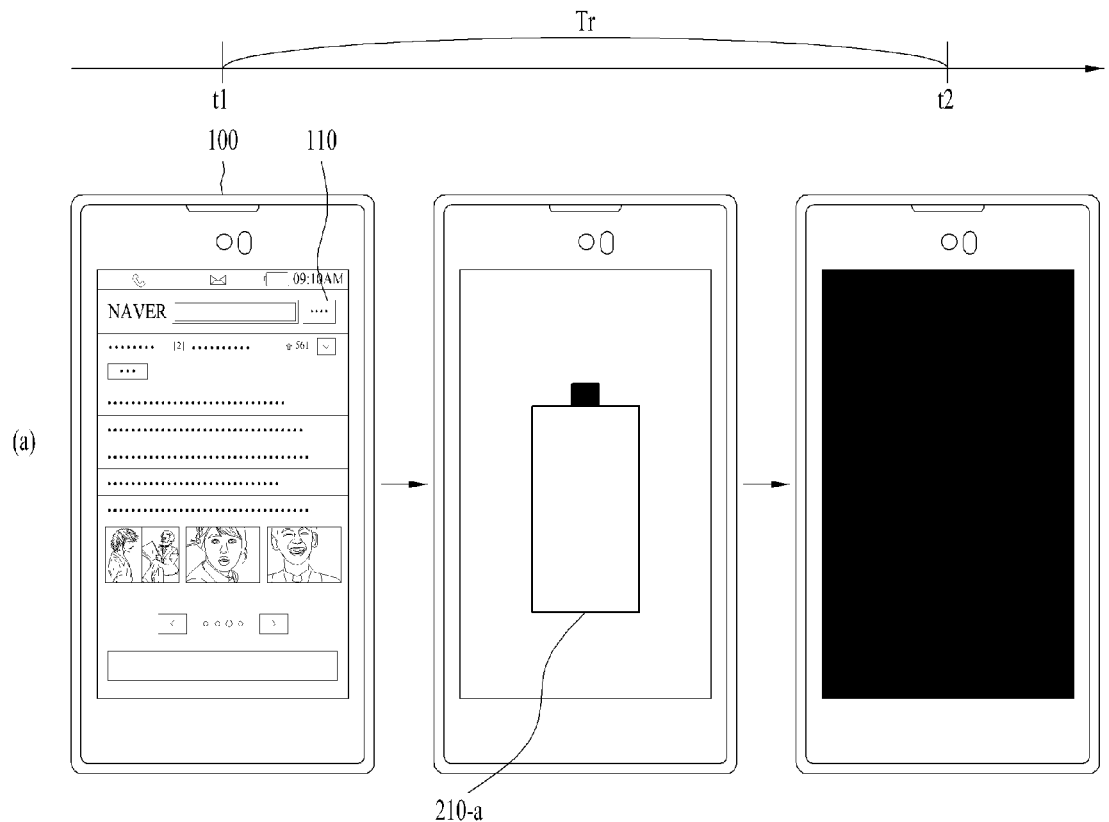
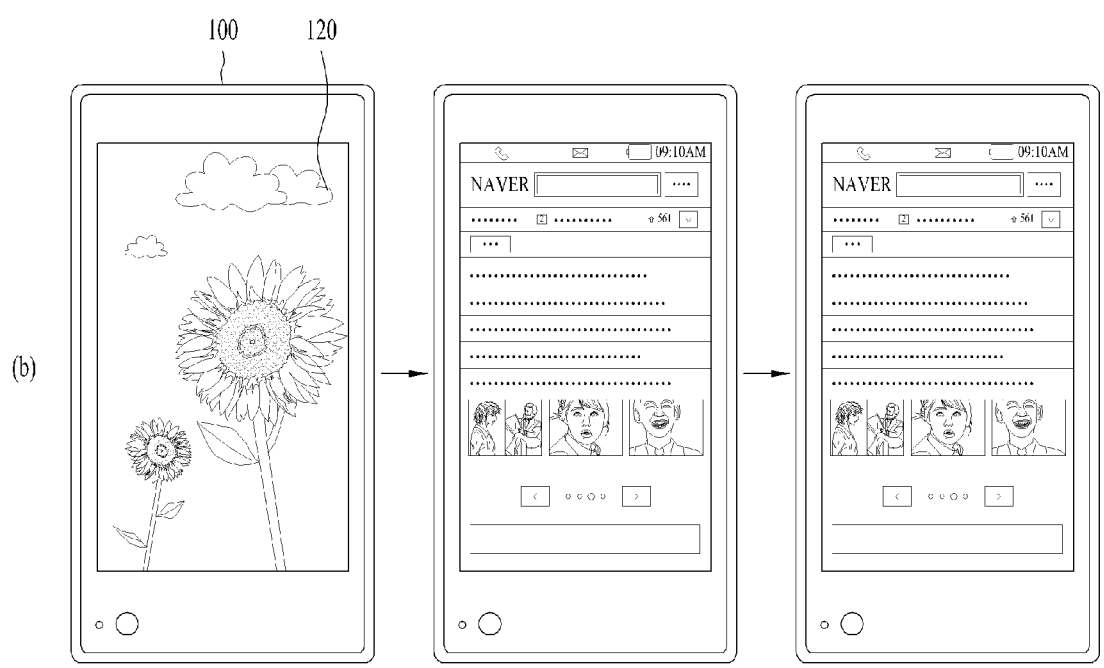

FIG. 6
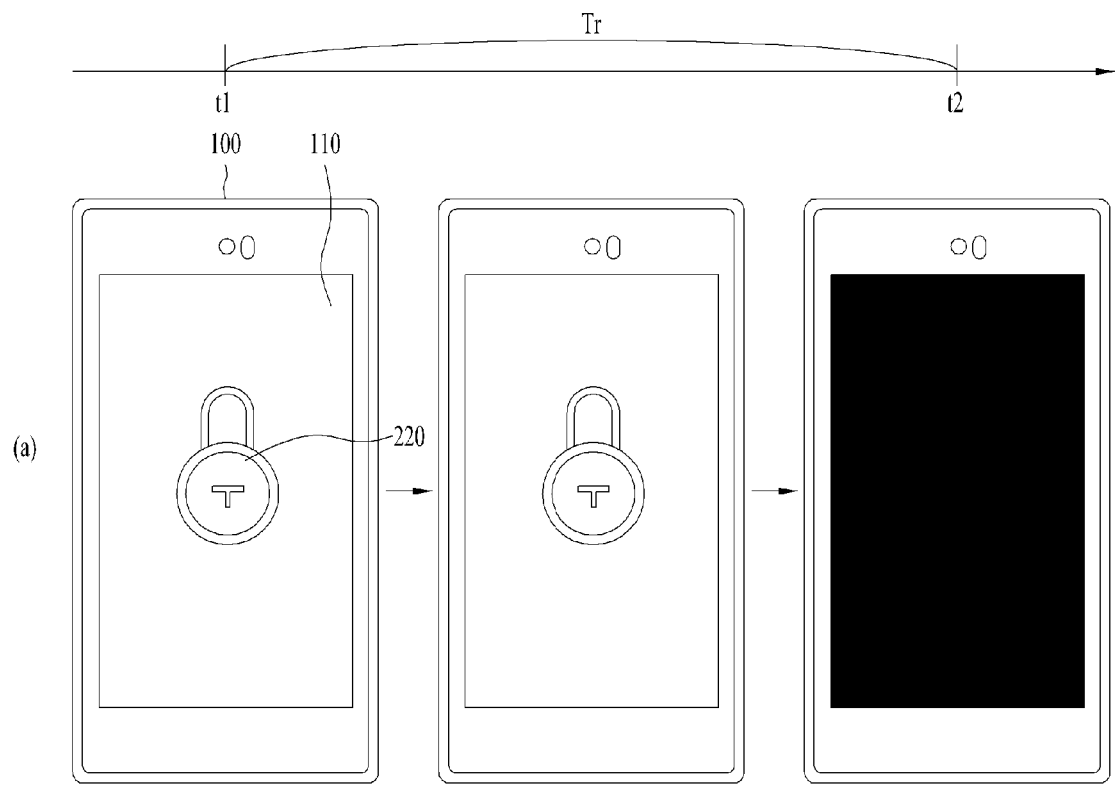
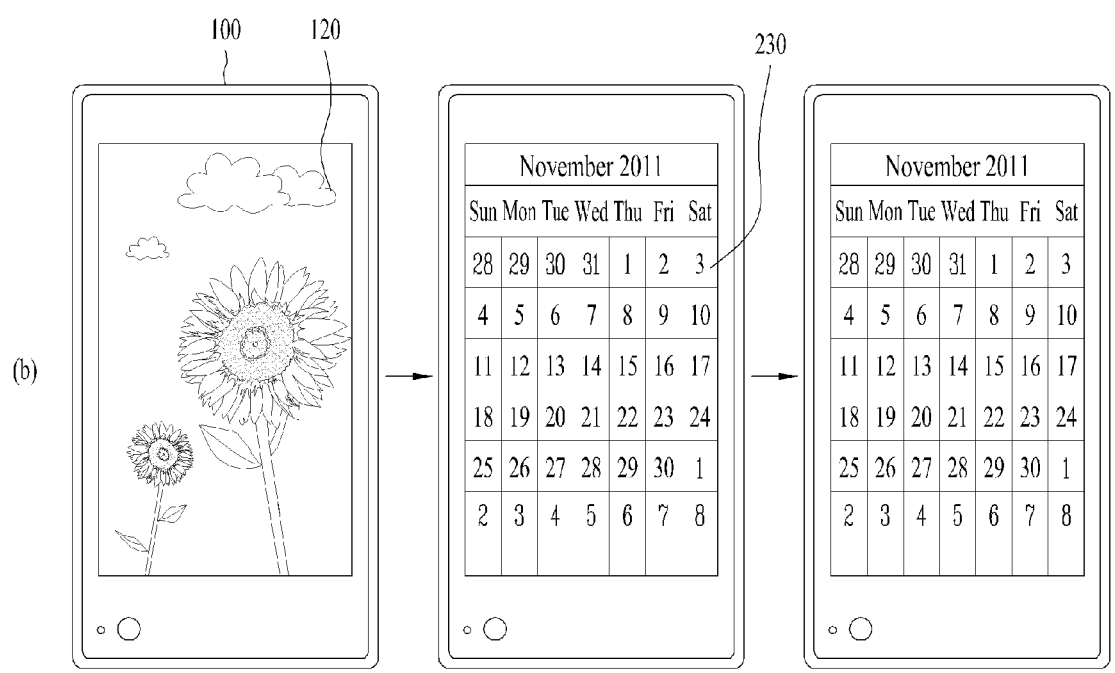

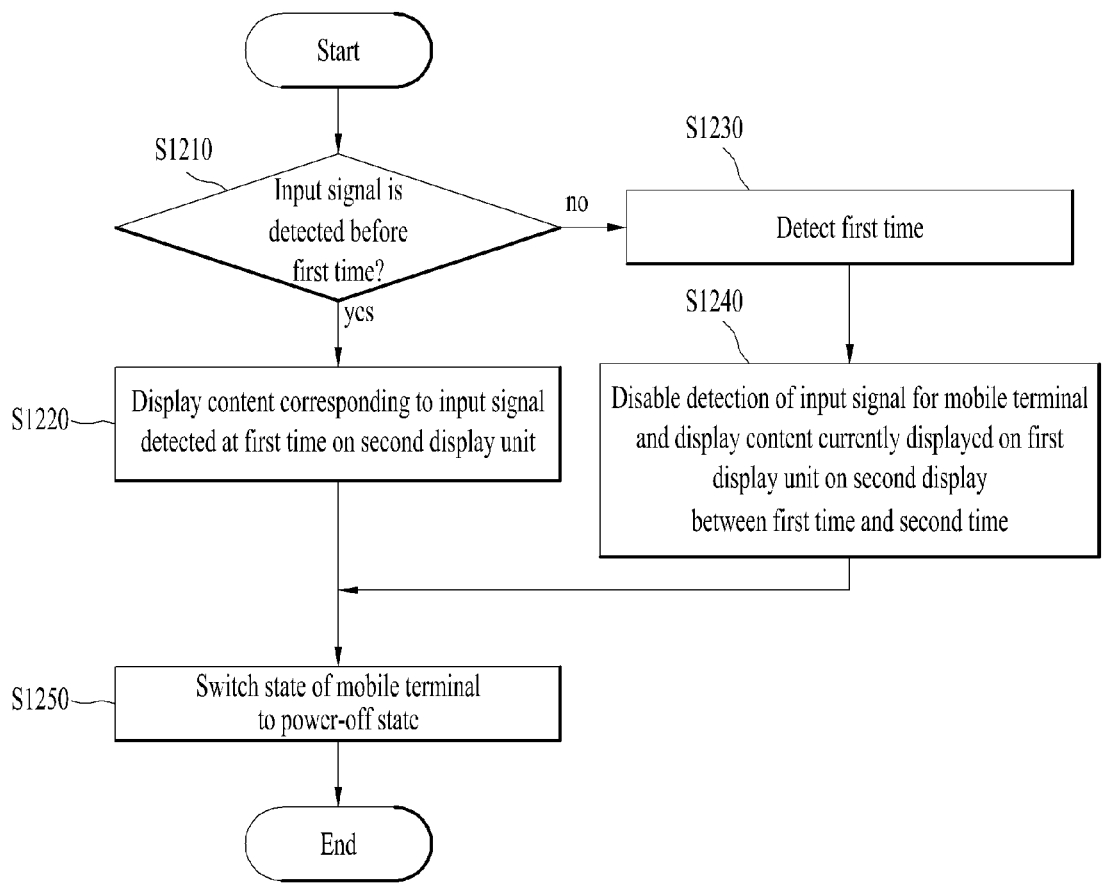

MOBILE TERMINAL HAVING A DOUBLE-SIDED DISPLAY AND CONTROLLING METHOD THEREOF

This application claims the benefit of the Korean Patent Application No. 10-2013-0030402, filed on Mar. 21, 2013, which is hereby incorporated by reference as if fully set forth herein.

BACKGROUND OF THE INVENTION

Field of the Invention

The present specification relates to a mobile terminal including a double-sided display unit and controlling method thereof, and more particularly, to a method of controlling a content, which is to be displayed on a second display unit in a power-off state of a mobile terminal, in a first display unit.

Discussion of the Related Art

Generally, a mobile terminal is a portable device equipped with a voice call function, a video call function, a contents display function and the like. As functions of a mobile terminal are diversified, the mobile terminal tends to be equipped with complicated functions for photo/video taking, music/video play, game play, broadcast reception and the like. Moreover, in order to enable a mobile terminal to implement complicated functions, various kinds of new attempts are applied in aspect of hardware/software.

Meanwhile, a mobile terminal uses such a device as an LCD, an LED and the like for a display unit. Recently, an e-paper is used as a display means of a mobile terminal. Since the e-paper is able to display an image with an external illumination only using electronic ink instead of liquid crystals without applying light from a backside of a screen unlike conventional displays, the e-paper can save a power. Moreover, if a power of the LCD is turned off, a displayed screen instantly disappears. Yet, even if a power is turned off, a screen of an e-paper can be maintained intact.

SUMMARY OF THE INVENTION

Accordingly, the present specification is directed to a mobile terminal including a double-sided display unit and controlling method thereof that may substantially obviate one or more of the problems due to limitations and disadvantages of the related art.

According to one embodiment, an object of the present specification is to provide a mobile terminal including a double-sided display unit and controlling method thereof, by which a content can keep being used in a power-of mode of the mobile terminal using the properties of an e-paper display panel.

Another object of the present specification is to provide a mobile terminal including a double-sided display unit and controlling method thereof, by which an image currently displayed on a first display unit right before a power-off state of the mobile terminal can be displayed on a second display unit in a power-off state.

When a security content with a concern for an infringement of user's privacy is displayed on a first display unit right before a power-off state of a mobile terminal, a further object of the present specification is to provide a mobile terminal including a double-sided display unit and controlling method thereof, by which the privacy infringement can be prevented in a manner of displaying a default content on a second display unit in a power-off state.

When a content displayed on a second display unit is selected in advance in a power-off state of a mobile terminal, another further object of the present specification is to provide a mobile terminal including a double-sided display unit and controlling method thereof, by which the mobile terminal is enabled to display the selected content on the second display unit in the power-off state.

Technical tasks obtainable from the present specification are non-limited the above mentioned effect. And, other unmentioned technical tasks s can be clearly understood from the following description by those having ordinary skill in the technical field to which the present specification pertains.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present specification, as embodied and broadly described, a mobile terminal including a double-sided display unit according to one embodiment of the present specification may include a first display unit, a second display unit having an e-paper display panel, a sensor unit configured to detect an input signal and transmit the detected input signal to a processor, a power unit configured to supply a power, and the processor configured to control the first display unit, the second display unit, and the sensor unit, wherein the processor is further configured to detect a first time prior to a predetermined period from a second time at which the power of the mobile terminal is turned off, the processor configured to disable a detection of the input signal for the mobile terminal and control a content currently displayed on the first display unit to be displayed on the second display unit between the first timetime and the second time, the processor configured to switch a state of the mobile terminal to a power-off state at the second time.

To further achieve these and other advantages and in accordance with the purpose of the present specification, a method of controlling a mobile terminal including a first display unit and a second display unit having an e-paper display panel, according to another embodiment of the present specification may include the steps of detecting a first time, wherein the first time is prior to a predetermined period from a second time at which the power of the mobile terminal is turned off, disabling a detection of the input signal for the mobile terminal and displaying a content currently displayed on the first display unit on the second display unit between the first time and the second time, and switching a state of the mobile terminal to a power-off state.

It is to be understood that both the foregoing general description and the following detailed description are exemplary and explanatory and are intended to provide further explanation of the invention as claimed.

Accordingly, the present specification provides the following effects and/or features.

First of all, according to one embodiment, a user can continue to use the same content as used in a power-on state via a second display unit of a mobile terminal in a power-off state.

Secondly, according to one embodiment, even if a user does not applies a specific input right before turning off of a power of a mobile terminal, the user can use a content, which is currently displayed on a first display unit, via a second display unit.

Thirdly, according to one embodiment, when a user uses a content with a concern for an infringement of privacy in a first display unit, even if a mobile terminal is turned off without a specific input, the infringement of user's privacy can be prevented in a manner of displaying a content free from the infringement of privacy on a second display unit.

Fourthly, according to one embodiment, when a user selects a content from a power-off display interface, the selected content can be used in a second display unit conveniently and easily in a power-off state of a mobile terminal.

Finally, according to one embodiment, when a time prior to a predetermined period from a power-off state is detected, a mobile terminal displays a power-off indicator on a first display unit, thereby enabling a user to easily predict that a power of the mobile terminal will be turned off.

Effects obtainable from the present specification are non-limited the above mentioned effect. And, other unmentioned effects can be clearly understood from the following description by those having ordinary skill in the technical field to which the present specification pertains.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present specification will become more apparent upon consideration of the following description of preferred embodiments, taken in conjunction with the accompanying drawing figures.

FIG. 2 is a diagram of a first display unit and a second display unit of a mobile terminal.

FIG. 3 is a diagram of a first display unit and a second display unit of a mobile terminal depending on a state of a mobile terminal.

FIG. 5 is a diagram for a power-off switching of a mobile terminal according to a second embodiment.

FIG. 6 is a diagram for a power-off switching of a mobile terminal according to a $3^{rd}$ embodiment.

FIG. 12 is a flowchart for a controlling method of a mobile terminal including a double-sided display unit.

DETAILED DESCRIPTION OF THE INVENTION

First of all, although terminologies used in the present specification are selected from general terminologies used currently and widely in consideration of functions in the present specification, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Reference will now be made in detail to the preferred embodiments of the present specification, examples of which are illustrated in the accompanying drawings. And, the present specification may be non-limited by the preferred embodiments of the present specification. Wherever possible, the same reference numbers will be used throughout the drawings to refer to the same or like parts.

Figure 1:
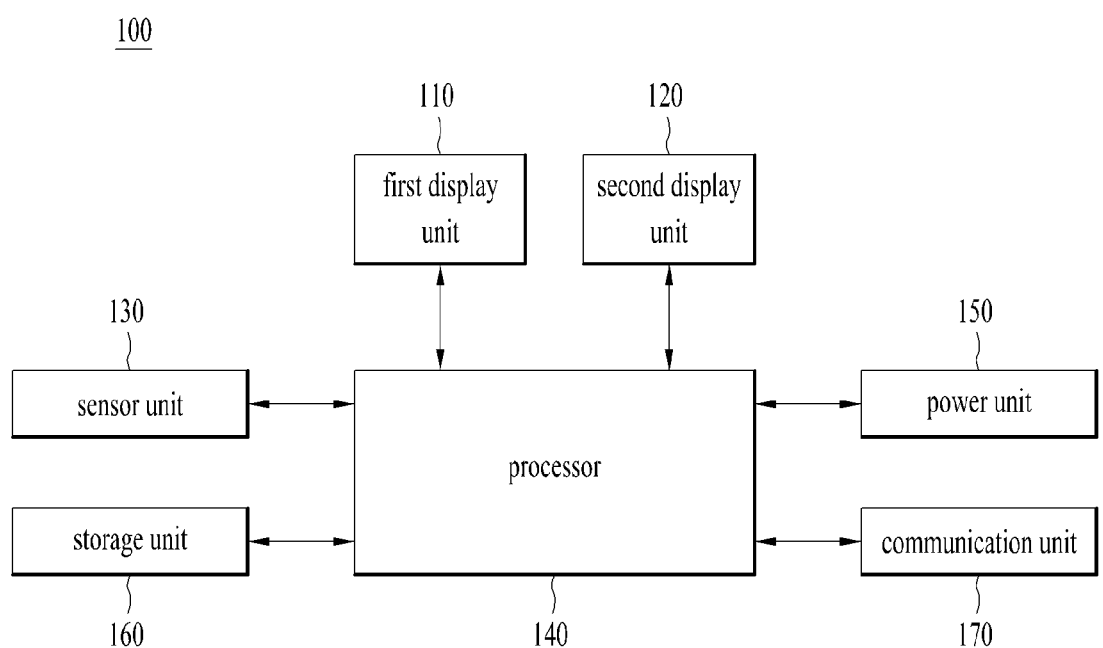
FIG. 1 is a block diagram of a mobile terminal including a double-sided display unit.

FIG. 1 is a block diagram of a mobile terminal including a double-sided display unit.

Referring to FIG. 1, a mobile terminal 100 including a double-sided display unit may include a first display unit 110, a second display unit 120, a sensor unit 130, a processor 140, a power unit 150, a storage unit 160 and a communication unit 170. Hereinafter, the mobile terminal 100 including the double-sided display unit may be briefly named a mobile terminal.

First, the mobile terminal 100 indicates a digital device that facilitates its portability. And, the mobile terminal 100 may include one of a mobile phone, a smart phone, a laptop, a digital broadcast terminal, a PDA (personal digital assistants), a PMP (portable multimedia player) and the like.

Each of the first display unit 110 and the second display unit 120 can display information processed by the mobile terminal 100. For instance, each of the first display unit 110 and the second display unit 120 can display a UI (user interface) or GUI (graphic user interface) related to the information processed by the processor 130.

The first display unit 110 may include one of a liquid crystal display (LCD), a thin film transistor liquid crystal display (TFT LCD), an organic light-emitting diode (OLED), a flexible display, a 3-dimensional (3D) display, and the like. According to one embodiment, the first display unit 110 may be provided to a front or rear side of the mobile terminal 100. And, the first display unit 110 may correspond to a main display of the mobile terminal 100. In particular, the first display unit 110 can be a main display and mainly executed a content or application by a user. In the present specification, as a power is turned on in an active state of the mobile terminal, a content is displayed on the first display unit 110. Yet, if the power is turned off, the content may not be displayed on the first display unit 110.

The second display unit 120 may include an e-paper display panel. An e-paper is a sort of a display system that uses e-ink. And, the e-paper may include a plurality of spherical capsules and a plurality of transistors provided over and under the spherical capsules. In particular, the spherical capsule can change colors in response to various electric shocks between transparent electrode plates and may display text or image.

Also, the second display unit 120 may be located on at least one of an opposite side, a top end portion, a bottom end portion, a left side and a right side of the first display unit 110. According to one embodiment, the second display unit 120 may be located on the opposite side of the first display unit 110. The second display unit 120 may correspond to a sub-display of the mobile terminal 100. For instance, while a user is using the first display unit 110, the second display unit 120 may be available for supplementary use. For another instance, in case that a battery of the mobile terminal 100 is insufficient, the second display unit 120 is usable for battery saving in a manner of displaying a content displayed on the first display unit 110 thereon by shifting the content to the second display unit 120. For further instance, the second display unit 120 is usable when a content displayed on the first display unit 110 is not viewable well outdoors.

Meanwhile, in the present specification, a touch sensor may be loaded on each of the first display unit 110 and the second display unit 120 to implement a touch screen type. In case that each of the first display unit 110 and the second display unit 120 is implemented into the touch screen type, each of the first display unit 110 and the second display unit 120 is usable as an input device as well as an output device. And, the touch sensor relevant matter shall be explained in the following description of the sensor unit 130.

Next, the sensor unit 130 can detect a user input using at least one sensor installed on the mobile terminal 100 and can transmit an input signal according to a result of the detection to the processor 140. In this case, the sensor unit 130 may include a plurality of sensing means. According to one embodiment, a plurality of the sensing means may include at least one of a gravity sensor, a geomagnetic sensor, a motion sensor, a gyro sensor, an acceleration sensor, an IR (infrared ray) sensor, an inclination sensor, an illumination intensity sensor, an altitude sensor, an odor sensor, a temperature sensor, a depth sensor, a pressure sensor, a bending sensor, an audio sensor, a video sensor, a GPS (global positioning system) sensor, a grip sensor, a touch sensor, a proximity sensor and the like. And, the above-mentioned various sensing means may be commonly called the sensor unit 130. The sensor unit 130 senses various user inputs and the environment of the mobile terminal 100 and may deliver the sensing results to the processor 140 to perform various operations corresponding to the sensing results, respectively. The above-mentioned sensors may be included as separate elements in the mobile terminal 100. Alternatively, the above-mentioned sensors may be included in the mobile terminal 100 in a manner of being integrated into at least one element.

In the present specification, the sensor unit 130 can detect an input signal applied to the mobile terminal 100. In this case, the input signal may include a touch input to the first display unit 110. For instance, the touch input may include one of a proximity touch and a contact touch. In particular, the proximity touch may include an action performed in a manner that a user's hand or object is situated close to the display unit 110/120 without directly contacting with the display unit 110/120. And, the input signal may include an input to a home button or a side button of the mobile terminal 100. In particular, the home button may include a physical key provided to the front side of the mobile terminal and the side button may include a physical key provided to a lateral side of the mobile terminal 100. And, each of the home button and the side button may correspond to the button via which an input is recognizable by a physical force.

In the present specification, the sensor unit 130 can detect an input signal applied to a power-off display interface displayed on the first display unit 100 before a first time. And, the sensor unit 130 can detect an input signal applied to the first display unit 110 between the first time and a second time. The first time and the second time shall be described later.

The processor 140 can activate a content received through data communication, a content saved in the storage unit 160 and the like. The processor 140 can activate various applications and process data within the mobile terminal 100. The processor 140 can control each of the units of the mobile terminal. And, the processor 140 can control data transmissions and receptions between the units.

In the present specification, the process 140 can detect the first time. In this case, the first time indicates a time prior to a predetermined period from a second time at which the power of the mobile terminal 100 is turned off. The process 140 can disable the detection of an input signal applied to the mobile terminal between the first time and the second time and display a content, which is currently displayed on the first display unit 110, on the second display unit 120. At the second time, the processor 140 can switch a state of the mobile terminal 100 to a power-off state. At the first time, the processor 140 can disable the detection of an input signal applied to the mobile terminal 100. For instance, the operation of disabling the detection of an input signal may correspond to an operation of not detecting an input signal. For another instance, the operation of disabling the detection of an input signal may include an operation of not performing an operation corresponding to an input signal despite that the input signal is detected. Operations of the processor 140 shall be described in detail with reference to FIGS. 4 to 12 later.

The power unit 150 corresponds to a power source connected to a battery within the mobile terminal 100 or an external power and may supply a power to the mobile terminal 100. In the present specification, when an available level of the power unit 150 becomes 0, the power of the mobile terminal 100 may enter a power-off state.

The storage unit 160 can store various digital data of videos, audios, photos, applications and the like. The storage unit 160 may store programs for the processing and controls conducted by the processor 140 and perform a function of temporary storage of inputted and outputted data. And, the storage unit 160 may include various digital data storage spaces of a slash memory, a random access memory (RAM), a solid state drive (SSD) and the like.

The communication unit 170 may perform communications with external devices using various kinds of protocols and transmit/receive data through the communications. The communication unit 170 may access a network by wire/wireless and transmit/receive digital data of contents and the like. In the present specification, the mobile terminal 100 can transmit/receive data to/from an external device or a server using the communication unit 170. Moreover, in the present specification, the communication unit 170 may be optionally provided to the mobile terminal 100.

Besides, FIG. 1 shows the bock diagram of the mobile terminal 100 according to one embodiment. In FIG. 1, the separately displayed blocks indicate the components or elements of the mobile terminal 100 logically and discriminately. Therefore, the above-described elements of the mobile terminal 100 may be implemented into a single chip or a plurality of chips in accordance with the corresponding device design.

FIG. 2 is a diagram of a first display unit and a second display unit of a mobile terminal.

Referring to FIG. 2 (a), a first display unit 110 may be located at a front or rear side of a mobile terminal 100. Moreover, as mentioned in the foregoing description with reference to FIG. 1, the first display unit 110 is a main display of the mobile terminal 100 and may correspond to a display unit on which a user mainly activates a content or application.

Referring to FIG. 2 (b), a second display unit 120 may be located at a side opposite to the first display unit 110. For instance, the first display unit 110 may be used to display a video or color content that consumes a relatively large power. And, the second display unit 120 may be used to display a text that consumes a relatively small power.

FIG. 3 is a diagram of a first display unit and a second display unit of a mobile terminal depending on a state of a mobile terminal. In FIG. 3, a state of a mobile terminal 100 may include a power-on state or a power-off state. FIG. 3 (a) shows a state of a first display unit 110 and FIG. 3 (b) shows a state of a second display unit 120.

First of all, the power-on state may correspond to a state, in which an input signal applied to the mobile terminal 100 is detected and a content or application is currently active in the mobile terminal 100. Referring to FIG. 3, in the power-on state, the mobile terminal 100 can display contents on the first display unit 110 and the second display unit 120, respectively.

In the present specification, the power-on state may include a state in which the mobile terminal 100 enters a first time. In this case, the first time may correspond to a time prior to a predetermined period from a time at which a power of the mobile terminal 100 is turned off. For instance, the first time may correspond to a time right before the power of the mobile terminal 100 is turned off. In this case, for instance, in the state that the first time is entered, the mobile terminal 100 can disable the detection of an input signal applied to the mobile terminal 100. In particular, since an available capacity of the power unit of the mobile terminal is almost zero, even if the input signal is detected, the mobile terminal is unable to perform an operation corresponding to the detected input signal.

Meanwhile, the power-off state may correspond to a state in which the power of the mobile terminal 100 is turned off. The power-off state may correspond to a state that an available capacity of the power unit of the mobile terminal 100 is zero. Referring to FIG. 3, although the first display unit 110 is deactivated in the power-off state, the content displayed on the second display unit 110 can be maintained as it is. In particular, in the power-of state, the second display unit 120 including the e-paper display panel can maintain the same image of a content, which is displayed right before the power is turned off.

In consideration of the above description, the present specification intends to provide a method of keeping displaying a content on the second display unit 120 using the e-paper display panel when the mobile terminal 100 enters the power-off state. This shall be described with reference to FIGS. 4 to 12.

Figure 4:
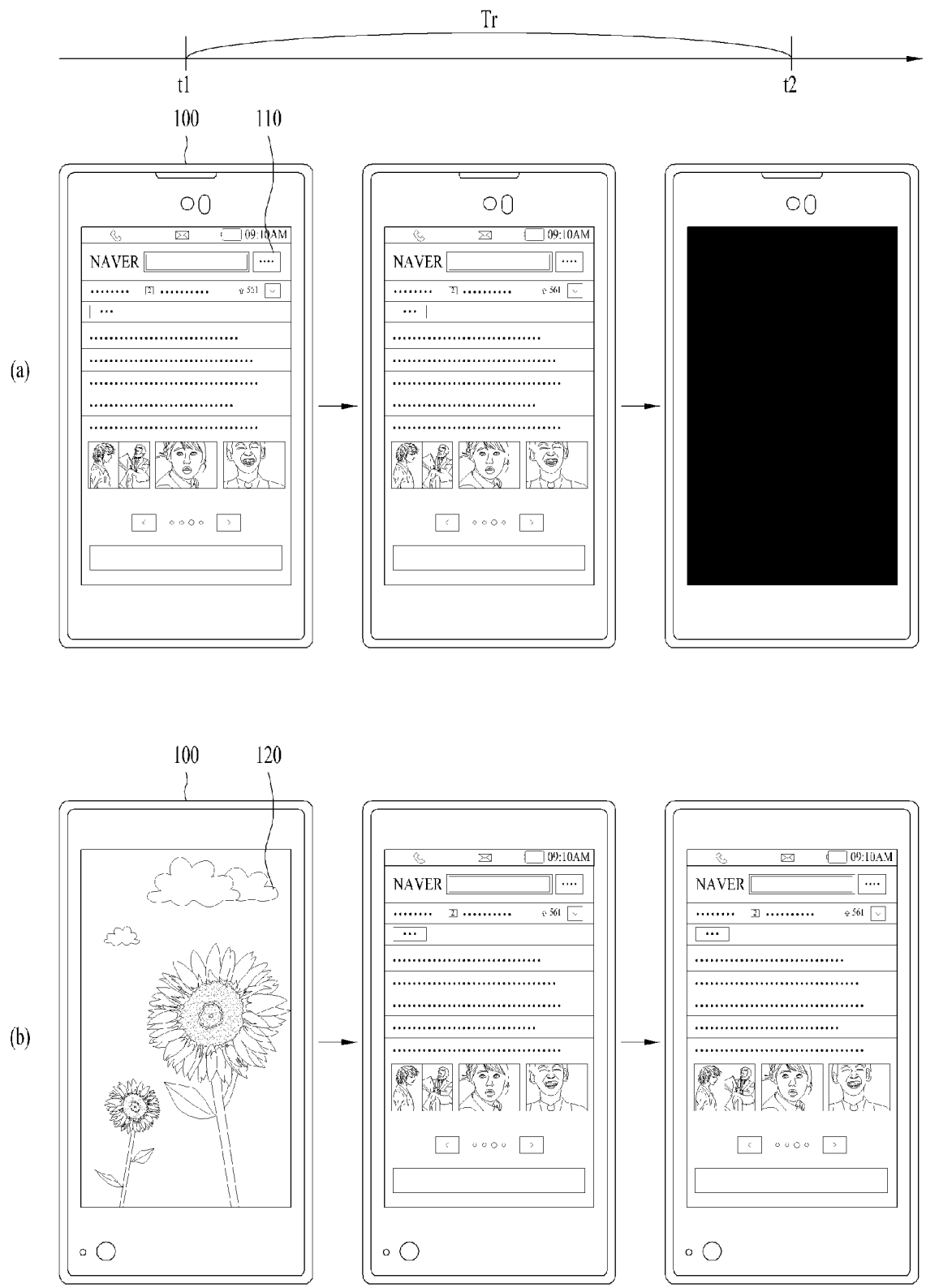
FIG. 4 is a diagram for a power-off switching of a mobile terminal according to a first embodiment.

FIG. 4 is a diagram for a power-off switching of a mobile terminal according to a first embodiment. In particular, FIG. 4 shows a change of a mobile terminal in response to a time elapse from a first time to a second time. FIG. 4 (a) shows a change of a first display unit 110. FIG. 4 (b) shows a change of a second display unit 120.

First, a mobile terminal 100 can detect a first time t1. In this case, the first time t1 may be determined based on an available capacity of a power unit of the mobile terminal 100. For instance, as mentioned in the foregoing description with reference to FIG. 3, the first time t1 may indicate the time prior to a predetermined period Tr from a second time t2 at which a power of the mobile terminal 100 is turned off.

In particular, the first time t1 may correspond to the time right before the power of the mobile terminal 100 is turned off. In this case, the predetermined period Tr may be automatically set or set by a user input. For instance, the predetermined period may correspond to one of 2 seconds, 4 seconds, 6 seconds and the like. For instance, in FIG. 4, the first time t1 may correspond to the time prior to 2 seconds before the power of the mobile terminal 100 is turned off. Moreover, the first time t1 may correspond to a time at which the available capacity of the power unit is enough to update a content, which is displayed on the second display unit 120, once. In this case, the mobile terminal 100 corresponds to the second time t2 while changing the content displayed on the second display unit once at the first time t1 or maintaining the content displayed on the second display unit 120. Meanwhile, referring to FIG. 4 (b), the second display unit 120 of the mobile terminal 100 can display a previously displayed content at the first time t1.

Meanwhile, at the first time t1, the mobile terminal 100 can disable the detection of an input signal applied to the mobile terminal 100. For instance, the mobile terminal 100 may not detect an input signal at the first time t1. In particular, a processor of the mobile terminal 100 may control a sensor unit not to detect an input signal at the first time t1. For another instance, the mobile terminal 100 may not perform an operation corresponding to an input signal at the first time t1. In particular, although the processor of the mobile terminal 100 detects an input signal at the first time t1, it may not perform an operation corresponding to the detected input signal. This is because an available capacity of the power unit of the mobile terminal barely remains.

At the first time t1, the mobile terminal 100 can control a brightness of each of the first display unit 110 and the second display unit 120 to get dark. For instance, the mobile terminal 100 can adjust the brightness of each of the first display unit 110 and the second display unit 120 to be set to 50% at the first time t1. Through this, the mobile terminal 100 can remind a user that the available capacity of the power unit is almost 0 using the brightness adjustment of the display units.

Next, between the first time t1 and the second time t2, the mobile terminal 100 can display a content, which is currently displayed on the first display unit 110, to be displayed on the second display unit 120. More specifically, between the first time t1 and the second time t2, the mobile terminal 100 can display an image of the content, which is currently displayed on the first display unit 110, to be displayed on the second display unit 120. In this case, the image of the content currently displayed on the first display unit 110 may correspond to the image of the content displayed on the first display unit 110 at the first time t1. This is because a user may desire to watch the content, which was used via the first display unit 110, via the second display unit 120 in a power-off state, in case that the user mainly uses the first display unit 110.

Also, between the first time t1 and the second time t2, the mobile terminal 100 can display the content, which is displayed on the first display unit 110 at the first time t1, to keep being displayed on the first display unit 110. In one embodiment, the content displayed on the first display unit 110 at the first time t1 may correspond to a static content such as an image, a text and the like. In this case, the mobile terminal 100 may display the same content to be displayed on the first display unit between the first time t1 and the second time t2. In another embodiment, the content displayed on the first display unit 110 at the first time t1 may correspond to a dynamic content such as a video and the like.

In this case, the mobile terminal 100 can display the image of the content, which was displayed on the first display unit 110 at the first time t1, to be displayed on the first display unit 110 between the first time t1 and the second time.

Also, between the first time t1 and the second time, the mobile terminal 100 can disable the detection of an input signal applied to the mobile terminal 100. For instance, the mobile terminal 100 may not detect an input signal between the first time t1 and the second time t2. In particular, the processor of the mobile terminal 100 may control the sensor unit not to detect an input signal between the first time t1 and the second time. For another instance, the mobile terminal 100 may not perform an operation corresponding to an input signal between the first time t1 and the second time. In particular, if the processor of the mobile terminal 100 detects an input signal between the first time t1 and the second time t2, it may not perform an operation corresponding to the detected input signal.

Meanwhile, between the first time t1 and the second time, the mobile terminal 100 can control the brightness of the first display unit 110 to become dark. This is to save a remaining battery power because an available capacity of the power unit is almost 0 already when the mobile terminal 100 arrives at the state of the first time t1.

Next, the mobile terminal 100 may enter a power-off state at the time t2. That is, when the available capacity of the power unit is 0, a state of the mobile terminal 100 may be switched to the power-off state. In this case, since the power is not supplied, any contents are displayed on the first display unit 110 of the mobile terminal. Yet, even if the power is not supplied, the same image of the content, which was displayed before the power is turned off, may be displayed on the second display unit 120 including an e-paper display panel. With respect to this, referring to FIG. 4, at the second time t2, the first display unit 110 may be deactivated and the same image of the content displayed on the first display unit 110 at the first time t1 may be maintained on the second display unit 120. In particular, between the first time t1 and the second time t2, the mobile terminal 100 can display the image of the content displayed on the second display unit 120 to be maintained on the second display unit 120. In doing so, the deactivation of the first display unit 110 may include an operation of not displaying any contents on the first display unit 110.

According to the first embodiment, although the battery of the mobile terminal is completely consumed, a user can use an image of a content, which was used via the first display unit 110, via the second display unit 120.

FIG. 5 is a diagram for a power-off switching of a mobile terminal according to a second embodiment. In particular, FIG. 5 shows a change of a mobile terminal in response to a time elapse from a first time to a second time. FIG. 5 (a) shows a change of a first display unit 110. FIG. 5 (b) shows a change of a second display unit 120.

First, a mobile terminal 100 can detect a first time t1. In this case, as mentioned in the foregoing description with reference to FIG. 4, the first time t1 may indicate the time prior to a predetermined period Tr from a second time t2 at which a power of the mobile terminal 100 is turned off. For instance, the first time t1 may correspond to the time prior to 3 seconds before the power of the mobile terminal 100 is turned off.

Next, the mobile terminal 100 can display a power-off indicator 210-a on the first display unit 110 between the first time t1 and the second time t2. In this case, the power-off indicator 210-a may correspond to an indicator indicating that the power of the mobile terminal 100 is about to be turned off. And, the power-off indicator 210-a is displayed on the first display unit 110 between the first time t1 and the second time t2, thereby informing a user that the power of the mobile terminal 100 is about to be turned off.

Also, between the first time t1 and the second time t2, the mobile terminal 100 can display a content, which is currently displayed on the first display unit 110, to be displayed on the second display unit 120. With respect to this, referring to FIG. 5 (b), between the first time t1 and the second time t2, the mobile terminal 100 may display an image of a content, which is displayed on the first display unit 110, to be displayed on the second display unit 120.

Next, a state of the mobile terminal 100 may be switched to a power-off state at the second time t2. In this case, the first display unit 110 is deactivated and the same image of the content, which is displayed right before the power-off, can be displayed on the second display unit 120. Referring to FIG. 5, the mobile terminal 100 can display the image of the content, which was displayed at the first time t1, to be displayed on the second display unit 120 at the second time t2.

According to the second embodiment, a user can be aware of the elapse of the first time t1 before the power-off of the mobile terminal via the power-off indicator 210-a.

FIG. 6 is a diagram for a power-off switching of a mobile terminal according to a $3^{rd}$ embodiment. In particular, FIG. 6 shows a change of a mobile terminal including a first display unit configured to display a predetermined content 220 in response to a time elapse from a first time to a second time. FIG. 6 (a) shows a change of a first display unit 110. FIG. 6 (b) shows a change of a second display unit 120.

First, a mobile terminal 100 can detect a first time t1. In this case, as mentioned in the foregoing description with reference to FIG. 4, the first time t1 may indicate the time prior to a predetermined period Tr from a second time t2 at which a power of the mobile terminal 100 is turned off. The mobile terminal 100 can display a predetermined content 220 on a first display unit 110 at the first time t1. In doing so, referring to FIG. 6 (a), the predetermined content 220 may correspond to a security content. In particular, the security content may correspond to the content with a concern for an infringement of user's privacy in case of being revealed to other people. For instance, the security content may include one of a bank security card, a personal schedule, a secret note, a business related content and the like.

Next, between the first time t1 and the second time t2, the mobile terminal 100 can update a content displayed on the second display unit 120. Yet, unlike the former description with reference to FIG. 4, if a content currently displayed on the first display unit 110 is the predetermined content 220, the mobile terminal 100 may display a default content 230 to be displayed on the second display unit 120. In this case, the default content 230 may correspond to a content free from the infringement of user's privacy despite being displayed to replace such a predetermined content as the security content 220. And, the default content may correspond to a content that needs not to change in response to a change of time. For instance, the default content may include such a content as a calendar content, a content of things to do today, and the like. Referring to FIG. 6 (b), the mobile terminal 100 may display a calendar content to be displayed as the default content 230 between the first time t1 and the second time t2.

In this case, in one embodiment, as mentioned in the foregoing description with reference to FIG. 4, the mobile terminal 100 may display the same image of a content, which was displayed on the first display unit 110 at the first time t1, to be displayed on the first display unit 110 between the first time t1 and the second time t2. For instance, referring to FIG. 6, the mobile terminal may display the image of the predetermined content 220, which was displayed on the first display unit 110, to be displayed on the first display unit 110. In another embodiment, as mentioned in the foregoing description with reference to FIG. 5, the mobile terminal 100 may display a power-off indicator (not shown) to be displayed on the first display unit 110 between the first time t1 and the second time t2.

Next, a state of the mobile terminal 100 may be switched to a power-off state at the second time t2. In this case, any contents are not displayed on the first display unit 110 and the same image of the content, which was displayed right before the power-off, may be maintained on the second display unit 120. Referring to FIG. 6, the mobile terminal 100 can display the same image of the default content, which was displayed between the first time t1 and the second time t2, to be displayed on the second display unit 120 at the second time t2.

According to the 3$^{rd}$ embodiment, while a user is using a personal content on the first display unit 110, although a power of the mobile terminal 100 is turned off, a default content is displayed on the second display unit 120 instead of a security content, thereby protecting user's privacy.

Figure 7:
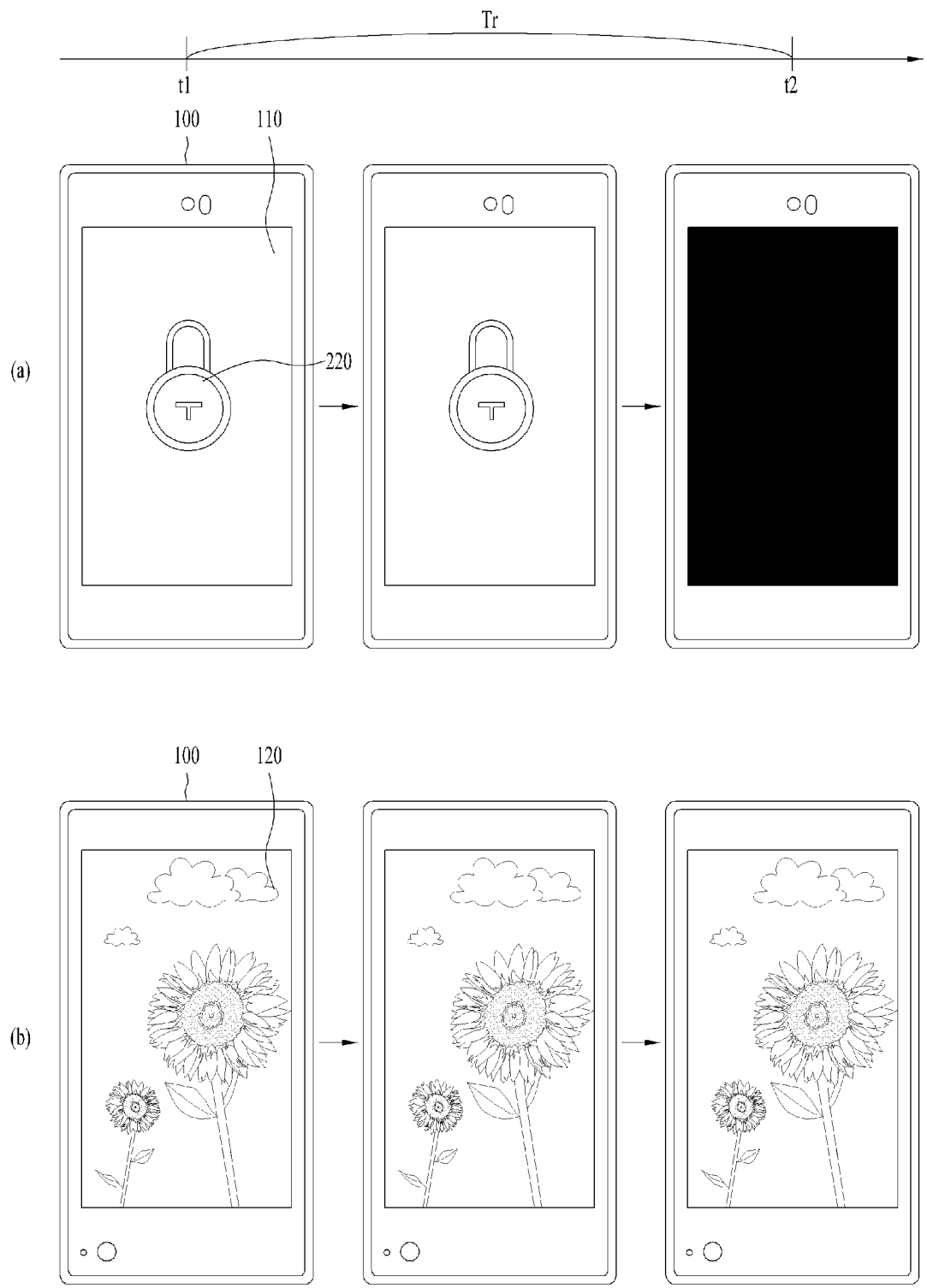
FIG. 7 is a diagram for a power-off switching of a mobile terminal according to a $4^{th}$ embodiment.

FIG. 7 is a diagram for a power-off switching of a mobile terminal according to a 4$^{th}$ embodiment. In particular, FIG. 7 shows a change of a mobile terminal including a first display unit configured to display a predetermined content 220 in response to a time elapse from a first time to a second time. FIG. 7 (a) shows a change of a first display unit 110. FIG. 7 (b) shows a change of a second display unit 120.

First, a mobile terminal 100 can detect a first time t1. As mentioned in the foregoing description with reference to FIG. 6, the mobile terminal 100 can display a predetermined content 220 at the first time t1. Moreover, at the first time t1, the mobile terminal 100 can display the same content, which is currently displayed on a second display unit 120, to be maintained.

Next, the mobile terminal 100 can display the content, which is currently displayed on the second display unit 120, to be maintained without changing between the first time t1 and the second time t2. In particular, the mobile terminal 100 can display the image of the content, which was displayed on the second display unit 120 at the first time t1, to be displayed on the second display unit between the first time t1 and the second time t2. For instance, if the content displayed on the second display unit 120 at the first time t1 includes a static content such as an image content, a text content and the like, the mobile terminal 100 may display the same content to be displayed on the second display unit 120 between the first time t1 and the second time t2. For another instance, if the content displayed on the second display unit 120 at the first time t1 includes a dynamic content such as a video content and the like, the mobile terminal 100 can display the image, which was displayed on the second display unit 120 at the first time t1, to be displayed on the second display unit 120 between the first time t1 and the second time. This is because, when the predetermined content 220 is displayed on the first display unit 110, the privacy infringement concern in case of enabling the content displayed on the second display unit 120 to keep being displayed is smaller than that in case of displaying a content with a concern for an infringement of privacy on the second display unit 120 in a power-off state. Meanwhile, in case that the predetermined content is displayed on the first display unit 110, as shown in FIG. 6 or FIG. 7, a determination of a content to be displayed on the second display unit 120 in the power-off state may be selected by an autonomous setting or a user's setting.

Next, a state of the mobile terminal 100 may be switched to a power-off state at the second time t2. In this case, as mentioned in the foregoing description with reference to FIG. 6, any contents are not displayed on the first display unit 110, while the same image of the content, which was displayed right before the power-off, may be maintained on the second display unit 120. Referring to FIG. 7 (b), the image of the content, which was displayed right before the power-off (i.e., between the first time t1 and the second time t2) can be maintained as it is.

According to the 4$^{th}$ embodiment, while a user is using a personal content on the first display unit 110, although a power of the mobile terminal 100 is turned off, a content free from a concern for an infringement of privacy is displayed on the second display unit 120, thereby protecting user's privacy.

Figure 8:
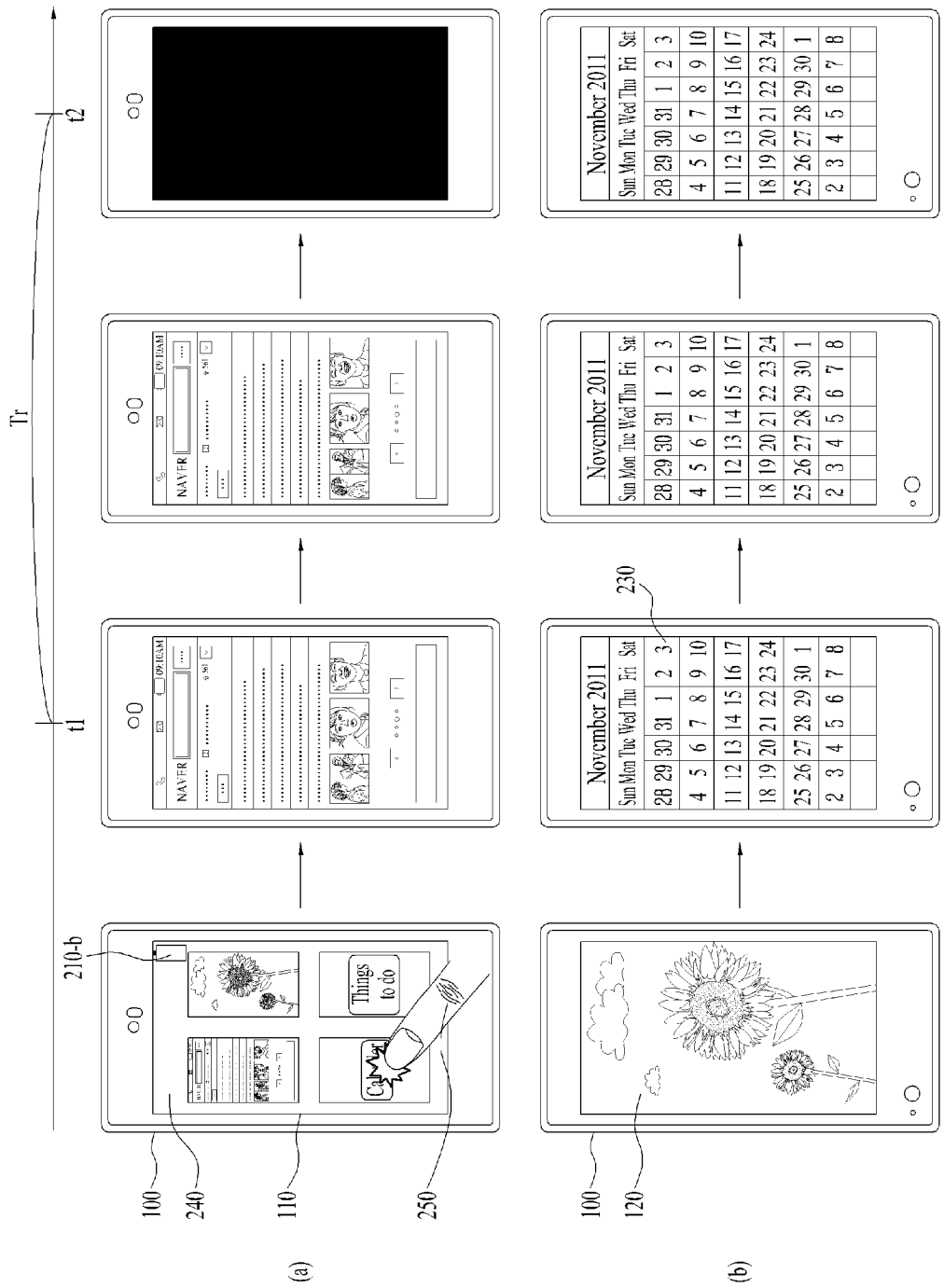
FIG. 8 is a diagram for a power-off switching of a mobile terminal according to a $5^{th}$ embodiment.

FIG. 8 is a diagram for a power-off switching of a mobile terminal according to a 5$^{th}$ embodiment. In particular, FIG. 8 shows a change of a mobile terminal having detected an input signal in response to a time elapse from a first time to a second time. FIG. 8 (a) shows a change of a first display unit 110. FIG. 8 (b) shows a change of a second display unit 120.

Next, a mobile terminal 100 can detect an input signal 250 applied to a first display unit 110 prior to a first time t1. In particular, the mobile terminal 100 can display the input signal 250 applied to a power-off content interface 240 displayed on the first display unit 110 prior to the first time t1. In this case, the input signal 250 may include a touch input to the first display unit 110. As mentioned in the foregoing description with reference to FIG. 1, the touch input may include one of a proximity touch and a contact touch. In particular, the proximity touch may include an action performed in a manner that a user's hand or object is situated close to the display unit without directly contacting with the display unit. The power-off content interface 240 may indicate an interface provided to select a content is to display on the second display unit 120 using an e-paper display in a power-off state of the mobile terminal. Referring to FIG. 8, for example, the power-off content interface 240 can display images of contents currently displayed on the first display unit 110 and the second display unit 120 prior to the first time t1, default contents and the like. For instance, the default content may include o a content that needs not to change in response to a change of time. For instance, the default content may correspond to such a content as a calendar content, a content of things to do today, and the like.

Meanwhile, in one embodiment, the power-off content interface 240 may be displayed on the first display unit 110 prior to a predetermined period Tr from the first time t1. For instance, if the predetermined period Tr is 3 seconds, the mobile terminal 100 can display the power-off content interface 240 to be displayed on the first display unit 110 prior to 3 seconds from the first time t1. In another embodiment, the power-off content interface 240 may be displayed on the first display unit 110 before the first time t1 by a user's input. In particular, the mobile terminal 100 can display the power-off content interface 240 on the first display unit 110 through a user input to a menu.

Also, in case that an input signal applied to the power-off content interface 240 is detected, the mobile terminal 100 may display a content corresponding to the input signal to be displayed on the second display unit 120 from the first time t1. For instance, referring to FIG. 8, the mobile terminal 100 can detect an input signal applied to 'Calendar' displayed on the power-off content interface 240 before the first time t1. In this case, the mobile terminal 100 can display an image of a content corresponding to 'Calendar' to be displayed on the second display unit 120 from the first time t1.

Meanwhile, in case that the first display unit 110 is provided to the front side of the mobile terminal 100, the mobile terminal 100 may display the power-off content interface 240. In particular, if the first display unit 110 is placed to face toward a user, the mobile terminal 100 displays the power-off content interface 240 to detect an input signal from the user. This is because, if the first display unit 110 does not face toward the user, the possibility in receiving a user's input signal applied to the first display unit 110 is low. Moreover, in case that the second display unit 120 is placed to face toward a user, it is only necessary to display the same content, which was used via the second display unit 120, in a power-off state, therefore, it is unnecessary to display the power-off content interface 240. Besides, the mobile terminal 100 can display a power-off indicator 210-b on the first display unit 110 together with the power-off content interface 240. Through this, the mobile terminal 100 can indicate that an available capacity of a power unit almost gets closer to 0.

Next, in case that an input signal applied to the power-off content interface 240 is detected before the first time t1, the mobile terminal 100 can display an originally displayed content on the first display unit 110 between the first time t1 and the second time t2. This is because the power-off content interface 240 is provided to set up a content displayed on the second display unit 120 in a power-off state instead of setting up a content displayed on the first display unit 110. Moreover, for instance, the mobile terminal 100 may display a power-off indicator on the first display unit 110 between the first time t1 and the second time t2. Through this, a user can be aware that an available capacity of a power unit of the mobile terminal 100 is close to 0.

Meanwhile, in case that an input signal applied to the power-off content interface 240 is not detected before the first time t1, as mentioned in the foregoing description with reference to FIGS. 4 to 7, the mobile terminal 100 can determine a content, which is to be displayed on the second display unit 120 in the power-of state, based on an image of a content displayed on the first display unit 110 or the second display unit 120 at the first time t1.

Next, the mobile terminal 100 can enter the power-off state at the second time t2. In doing so, since the power is not supplied, any contents are not displayed on the first display unit 110. Yet, the content, which was displayed right before the power-off, can be maintained on the second display unit including the e-paper display despite that the power is not supplied. Hence, the mobile terminal 100 can maintain the content displayed on the second display unit 120 in the power-off state. Referring to FIG. 8, the mobile terminal can maintain the content 'calendar' displayed on the second display unit 120 in the power-of state.

According to the 5$^{th}$ embodiment, a user can set up a content, which is to be displayed on the second display unit in the power-off state of the mobile terminal 100, using the power-off content interface 240.

Figure 9:
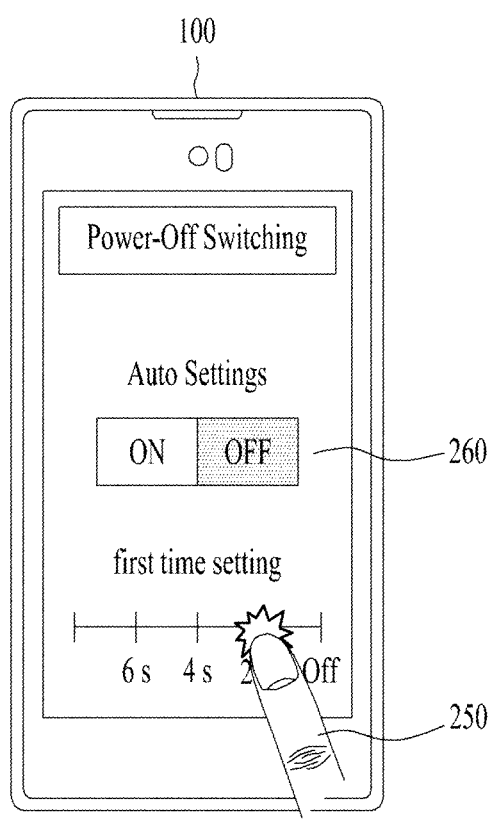
FIG. 9 is a diagram of a power-off switching interface of a mobile terminal.

FIG. 9 is a diagram of a power-off switching interface of a mobile terminal. In particular, FIG. 9 shows a power-off switching interface 260 that enables a user's setting for a switching to a power-off state of a mobile terminal.

A power-off switching interface 260 may indicate an interface for setting a first time related to a power-off of a mobile terminal 100. A user can select whether to automatically set up the first time using the power-off switching interface 260. In one embodiment, in the power-off switching interface 260 of the mobile terminal 100, the first time can be selected to be automatically set up. In doing so, the first time is set up for an autonomous setting time in the mobile terminal 100. For example, the autonomous setting time can be set to 3 seconds before a second time at which a power will be turned off. In this case, the mobile terminal 100 may detect '3 seconds prior to a power-off' as the first time.

In another embodiment, the power-off switching interface 260 may be selected to manually set up the first time. In this case, the first time can be set up by a user's selection 250. For example, it may set the first time to one of 2 seconds, 4 seconds, 6 seconds and the like from the second time at which a power will be turned off. Referring to FIG. 9, for instance, the first time can be set to 2 seconds prior to the second time at which a power will be turned off.

Figure 10:
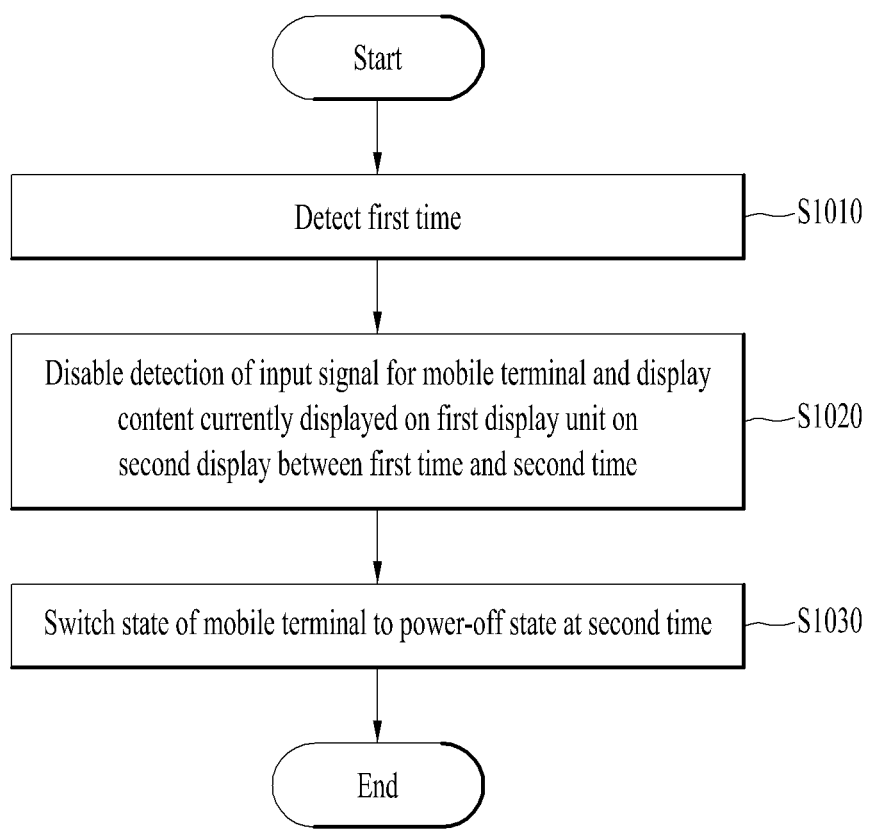
FIG. 10 is a flowchart for a controlling method of a mobile terminal including a double-sided display unit.

FIG. 10 is a flowchart for a controlling method of a mobile terminal including a double-sided display unit. Each of the steps shown in FIG. 10 can be controlled by the processor 140 of the mobile terminal 100 shown in FIG. 1.

First, the mobile terminal can detect a first time [S1010]. In doing so, the first time may be determined based on an available capacity of the power unit of the mobile terminal. For instance, the first time may correspond to a time before a predetermined period from a second time at which a power of the mobile terminal will be turned off. And, the first time may correspond to a time at which the available capacity of the power unit amounts to a capacity for updating a content displayed on the second display unit once. Moreover, as mentioned in the foregoing description with reference to FIG. 9, the first time may be set up by an autonomous setting or a user input. Meanwhile, as mentioned in the foregoing description with reference to FIG. 4, the mobile terminal may disable the detection of an input signal applied to the mobile terminal at the first time. For instance, the processor of the mobile terminal may control the sensor unit not to detect the input signal. Moreover, for instance, if the input signal is detected, the processor of the mobile terminal may not perform an operation corresponding to the detected input signal. On the other hand, the mobile terminal can control the brightness of each of the first display unit and the second display unit to become dark at the first time or between the first time and the second time.

Next, between the first time and the second time, the mobile terminal may disable the detection of the input signal applied to the mobile terminal and display a content, which is currently displayed on the first display unit, on the second display unit [S120]. For instance, between the first time and the second time, the mobile terminal may display an image of the content, which is currently displayed on the first display unit, on the second display unit. In doing so, the image of the content, which is currently displayed on the first display unit, may correspond to an image of a content displayed on the first display unit at the first time. Meanwhile, the mobile terminal can control the brightness of the first display unit to become dark at a time prior to the second time from the first time. Moreover, between the first time and the second time, the mobile terminal can display a power-off indicator on the first display unit.

Finally, the mobile terminal can enter a power-off state at the second time [S1030]. In doing so, the first display unit may be deactivated and the second display unit including the e-paper display panel may maintain the same content displayed before the second time.

Figure 11:
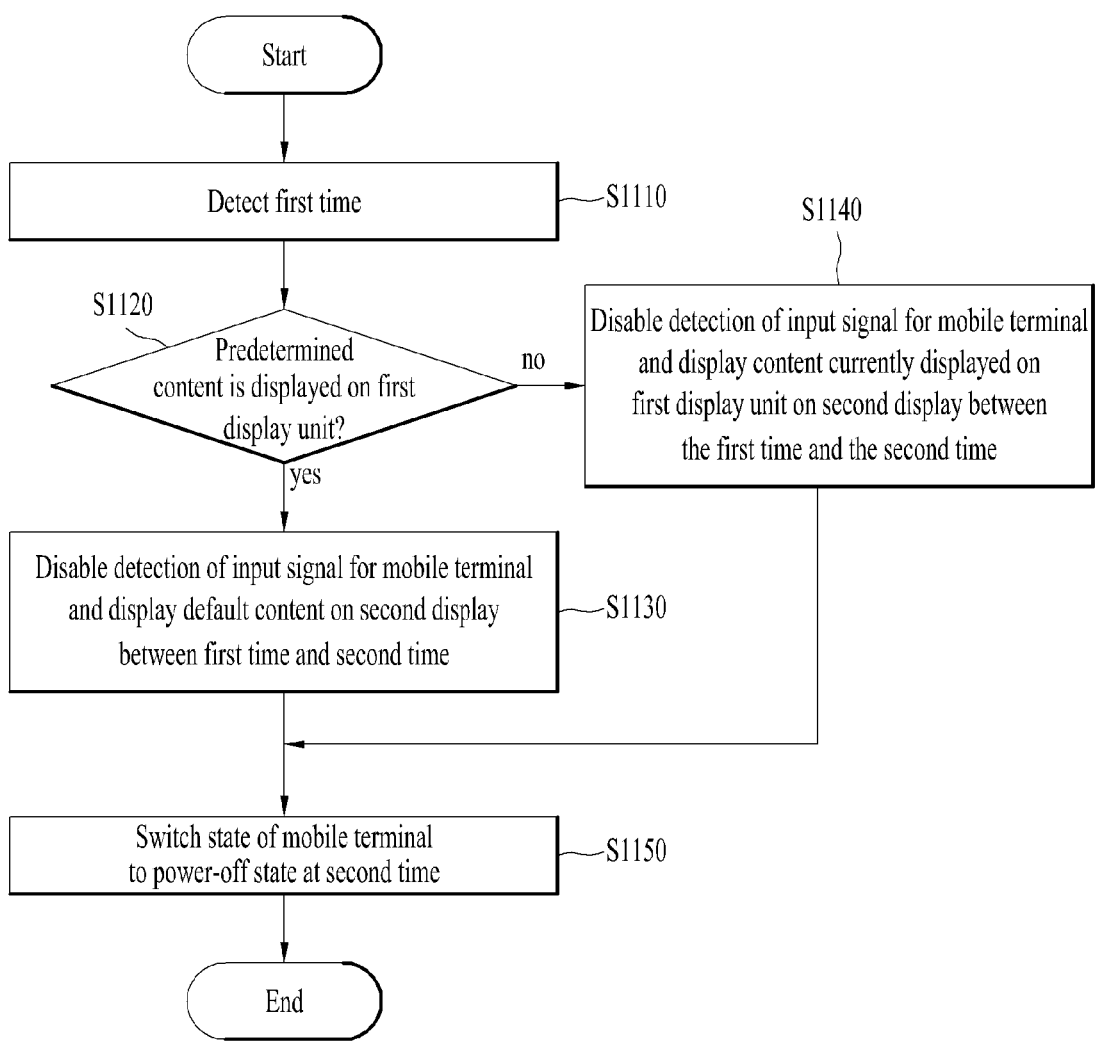
FIG. 11 is a flowchart for a controlling method of a mobile terminal including a double-sided display unit.

FIG. 11 is a flowchart for a controlling method of a mobile terminal including a double-sided display unit. Each of the steps shown in FIG. 11 can be controlled by the processor 140 of the mobile terminal 100 shown in FIG. 1. Moreover, details of the parts identical or similar to the former embodiment described with reference to FIG. 10 shall be omitted from the following description with reference to FIG. 11.

First, the mobile terminal may detect a first time [S1110]. Subsequently, the mobile terminal may determine whether a predetermined content is displayed on the first display unit [S1120]. In this case, as mentioned in the foregoing description with reference to FIG. 6, the predetermined content may include a security content. In particular, the security content may be the content with a concern for an infringement of user's privacy and include one of a security card, a personal schedule and the like.

In the step S1120, if the predetermined content is displayed on the first display unit, the mobile terminal may disable the detection of an input signal applied to the mobile terminal and display a default content on the second display unit, between the first time and a second time [S1130]. In this case, the default content may include such a content free from a concern for an infringement of user's privacy as a calendar content, a news content and the like.

Meanwhile, as mentioned in the foregoing description with reference to FIG. 7, if a predetermined content is displayed on the first display unit, the mobile terminal may not switch a content displayed on the second display unit between the first time and the second time.

On the contrary, if the predetermined content is not displayed on the first display unit in the step S1120, the mobile terminal may disable the input signal applied to the mobile terminal and display the content, which is currently displayed on the first display unit, on the second display unit, between the first time and the second time [S1140]. Finally, the mobile terminal may switch a power-off state at the second time [S1150].

FIG. 12 is a flowchart for a controlling method of a mobile terminal including a double-sided display unit. Each of the steps shown in FIG. 12 can be controlled by the processor 140 of the mobile terminal 100 shown in FIG. 1. Moreover, details of the parts identical or similar to the former embodiment described with reference to FIG. 10 shall be omitted from the following description with reference to FIG. 12.

First, the mobile terminal can detect whether an input signal is detected before a first time [S1210]. In this case, as mentioned in the foregoing description with reference to FIG. 8, the input signal detected before the first time may correspond to an input signal applied to a power-off content interface displayed on the first display unit. For instance, the power-off content interface may include a content currently displayed on the first display unit, a content currently displayed on the second display unit, a default content and the like. In case that the first display unit is provided to the front side of the mobile terminal, the mobile terminal may display the power-off content interface.

If the input signal is detected before the first time in the step S1210, the mobile terminal can display a content corresponding to the detected input signal on the second display unit at the first time [S1220]. In doing so, an originally displayed content may be displayed on the first display unit. And, the mobile terminal can disable the detection of an input signal between the first time and a second time.

On the contrary, if the input signal is not detected before the first time in the step S1210, the mobile terminal may detect the first time [S1230]. Subsequently, the mobile terminal may disable the input signal applied to the mobile terminal between the first time and the second time and display a content, which is currently displayed on the first display unit, to be displayed on the second display unit [S1240]. Finally, the mobile terminal may be switched to or enter a power-off state at the second time [S1250].

Although the description of the present specification is explained with reference to each of the accompanying drawings for clarity, it is possible to design new embodiment (s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

A mobile terminal including a double-sided display unit and controlling method thereof according to the present specification may be non-limited by the configurations and methods of the embodiments mentioned in the foregoing description. And, the embodiments mentioned in the foregoing description can be configured in a manner of being selectively combined with one another entirely or in part to enable various modifications.

In addition, a mobile terminal including a double-sided display unit and controlling method thereof according to the present specification can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present specification without departing from the spirit or scope of the inventions. Thus, it is intended that the present specification covers the modifications and variations of this invention provided they come within the scope of the appended claims and their equivalents.

Both apparatus and method inventions are mentioned in this specification and descriptions of both of the apparatus and method inventions may be complementarily applicable to each other.

What is claimed is:

1. A mobile terminal including a double-sided display unit, comprising:
   a first display unit;
   a second display unit having an e-paper display panel;
   a sensor unit configured to detect an input signal and transmit the detected input signal to a processor;
   a power unit configured to supply power; and
   the processor configured to control the first display unit, the second display unit, the sensor unit and the power unit,
   wherein the processor is further configured to:

detect a first time, wherein the first time is prior to a predetermined period from a second time at which the power of the mobile terminal is turned off, disable the detection of the input signal for the mobile terminal by non-detection of the input signal at the first time or by nonperformance of an operation corresponding to the input signal at the first time, change a content currently displayed on the second display unit to a content currently displayed on the first display unit between the first time and the second time before the mobile terminal is turned off, if the content currently displayed on the first display unit is a non-security content, display a default content on the second display unit or not switch a content displayed on the second display unit between the first time and the second time, if the content currently displayed on the first display unit is a security content, and switch a state of the mobile terminal to a power-off state at the second time, wherein the content currently displayed on the second display unit continues to be displayed via the e-paper display panel after the second time while the mobile terminal is in the power-off state.

2. The mobile terminal of claim 1, wherein the processor is configured to disable the detection of the input signal for the mobile terminal at the first time.

3. The mobile terminal of claim 1, wherein the processor is configured to display an image of the content currently displayed on the first display unit on the second display unit between the first time and the second time, wherein the image of the content currently displayed on the first display unit comprises an image of a content displayed on the first display unit at the first time.

4. The mobile terminal of claim 1, wherein the processor is configured to display the image of the content displayed on the second display unit at the first time on the second display unit between the first time and the second time.

5. The mobile terminal of claim 1, wherein the processor is configured to display a content corresponding to the detected input signal on the second display unit at the first time, if the input signal is detected before the first time.

6. The mobile terminal of claim 5, wherein the input signal detected before the first time comprises the input signal for a power-off content interface displayed on the first display unit.

7. The mobile terminal of claim 6, wherein the processor is configured to display the power-off content interface, if the first display unit is provided to a front side of the mobile terminal.

8. The mobile terminal of claim 1, wherein the first time is automatically set or set by a user input.

9. The mobile terminal of claim 1, wherein the processor is configured to display a power-off indicator on the first display unit between the first time and the second time.

10. The mobile terminal of claim 1, wherein the first time comprises a time at which an available capacity of the power unit amounts to a capacity capable of updating a content displayed on the second display unit.

11. The mobile terminal of claim 1, wherein the processor is configured to control the first display unit to become dark at the first time and between the first time and the second time.

12. A method of controlling a mobile terminal including a first display unit and a second display unit having an e-paper display panel, the method comprising:

detecting a first time, wherein the first time is prior to a predetermined period from a second time at which a power of the mobile terminal is turned off;

disabling a detection of the input signal for the mobile terminal by non-detection of the input signal at the first time or by nonperformance of an operation corresponding to the input signal at the first time;

change a content currently displayed on the second display unit to a content currently displayed on the first display unit between the first time and the second time before the mobile terminal is turned off, if the content currently displayed on the first display unit is a non-security content, displaying a default content on the second display unit or not switching a content displayed on the second display unit between the first time and the second time, if the content currently displayed on the first display unit is a security content, switching a state of the mobile terminal to a power-off state at the second time, wherein the content currently displayed on the second display unit continues to be displayed via the e-paper display panel after the second time while the mobile terminal is in the power-off state.

13. The method of claim 12, further comprising disabling the detection of the input signal for the mobile terminal.

14. The method of claim 12, the step of displaying comprising displaying an image of the content currently displayed on the first display unit on the second display unit between the first time and the second time, wherein the image of the content currently displayed on the first display unit comprises an image of a content displayed on the first display unit at the first time.

15. The method of claim 12, further comprising:
detecting the input signal before the first time; and
displaying a content corresponding to the detected input signal on the second display unit at the first time.

* * * * *